United States Patent [19]

Ingalls

[11] 4,194,346
[45] Mar. 25, 1980

[54] HARVEST SEPARATOR

[76] Inventor: Charles C. Ingalls, P.O. Box 382, Ceres, Calif. 95307

[21] Appl. No.: 881,542

[22] Filed: Feb. 27, 1978

[51] Int. Cl.² ............................................. A01D 51/00
[52] U.S. Cl. .................................... 56/328 R; 56/12.8; 56/16.5; 56/DIG. 8
[58] Field of Search ................... 56/328 R, 12.8, 12.9, 56/13.1, 16.5, DIG. 8, 330

[56] References Cited

U.S. PATENT DOCUMENTS

| | | | |
|---|---|---|---|
| 2,594,776 | 4/1952 | Hiatt | 56/328 R |
| 3,530,655 | 9/1970 | Whitney et al. | 56/328 R |
| 3,675,405 | 7/1972 | Denton | 56/328 R |
| 3,704,576 | 12/1972 | Quick | 56/330 |
| 3,760,573 | 9/1973 | Porter | 56/12.9 |

FOREIGN PATENT DOCUMENTS 2310171  9/1974  Fed. Rep. of Germany ............ 56/16.5

Primary Examiner—Jay N. Eskovitz
Attorney, Agent, or Firm—J. L. Bohan

[57] ABSTRACT

An apparatus for separating intermixed heavier and lighter materials of varied dimension and mass-to-area ratios, being particularly adapted to harvesting fallen nuts intermixed with leaves and other foreign matter. The separator element is used where the fruit and foreign matter are being borne in a common air stream by means of imposing the separator in said air stream whereby a perforated surface on said separator carries the debris in a direction opposite from the movement of the fruit towards a collection zone. The debris is carried away from the separator zone by the mechanical action of the moving surface in addition to the debris carrying propensity of the air stream.

4 Claims, 4 Drawing Figures

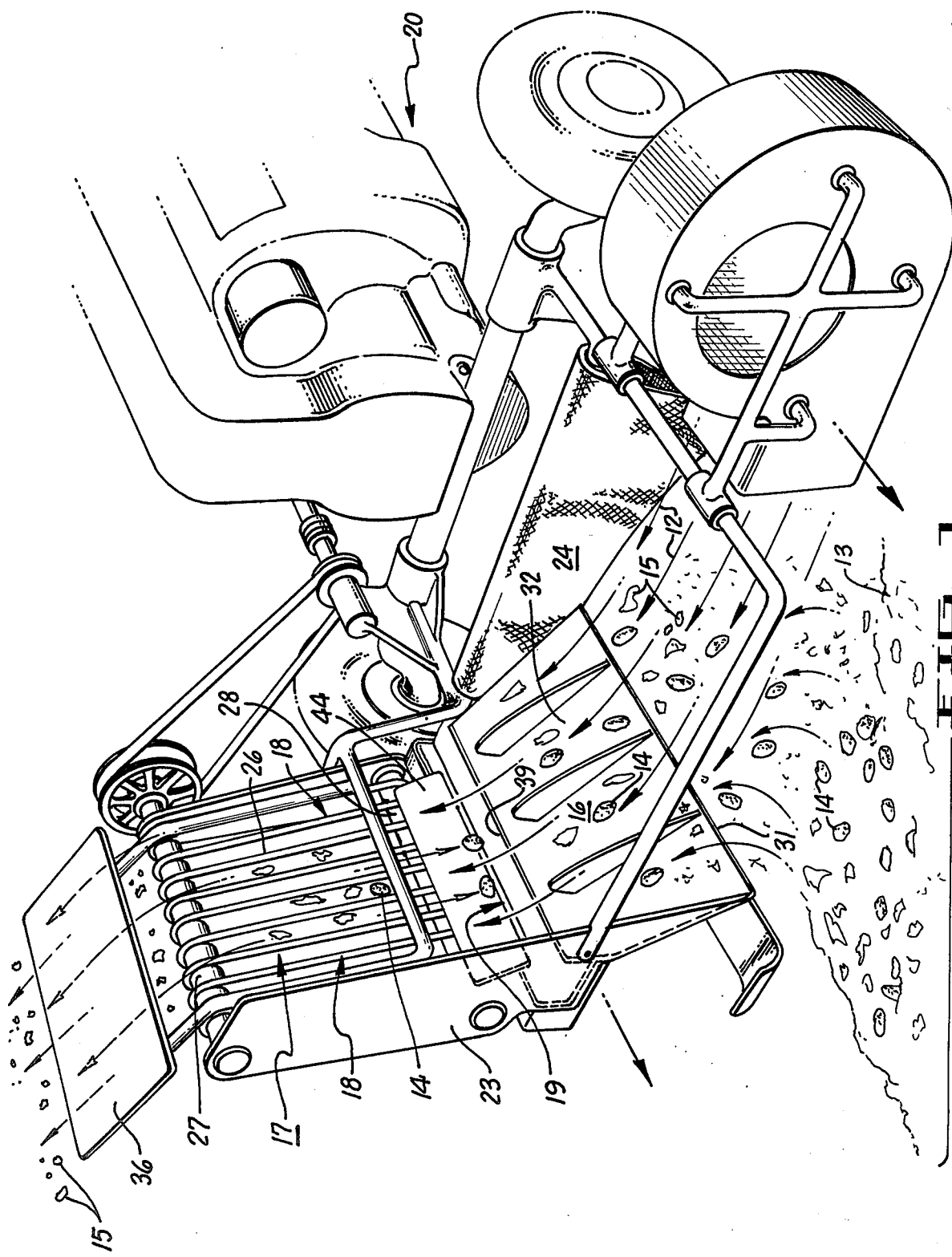

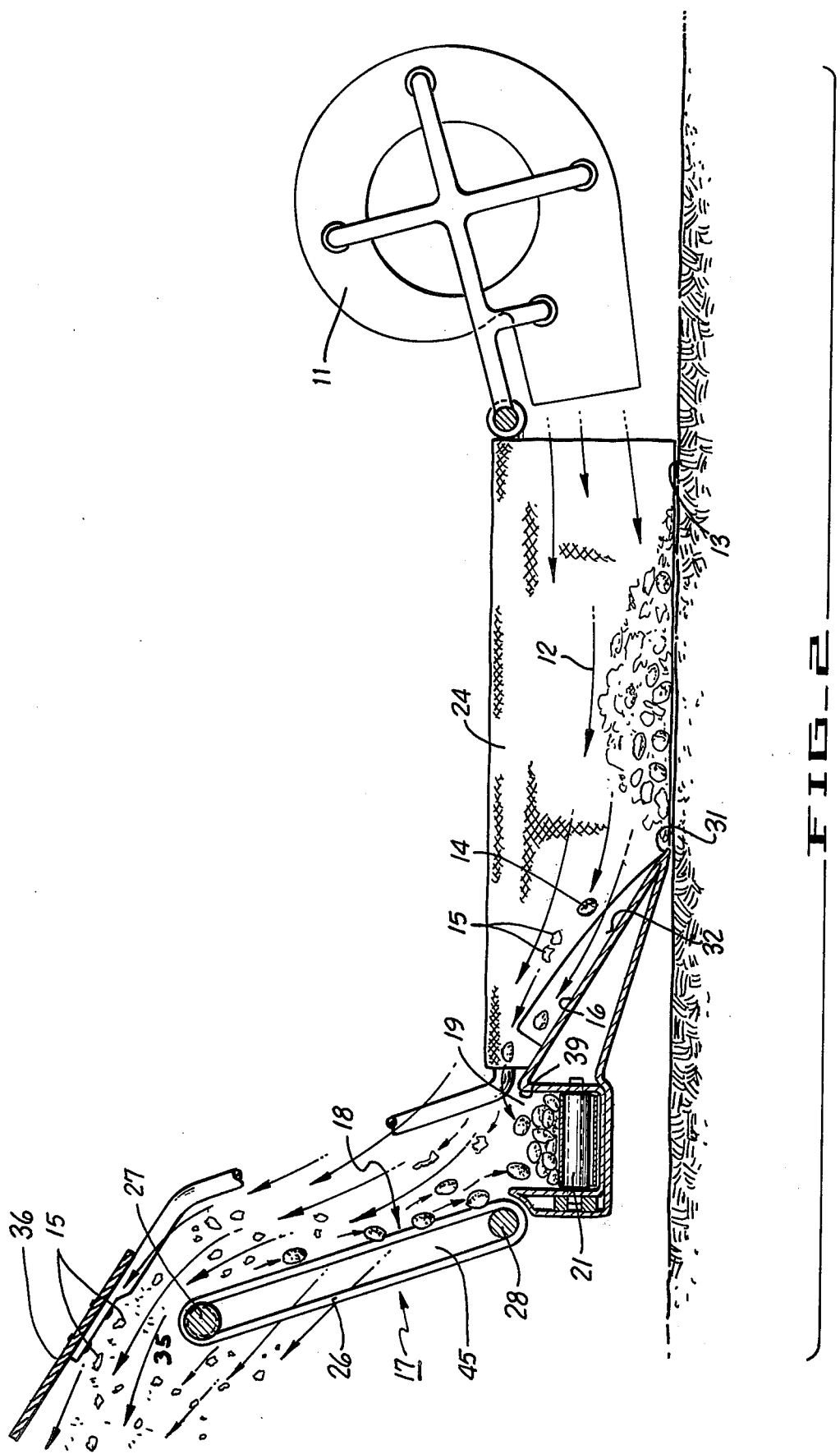

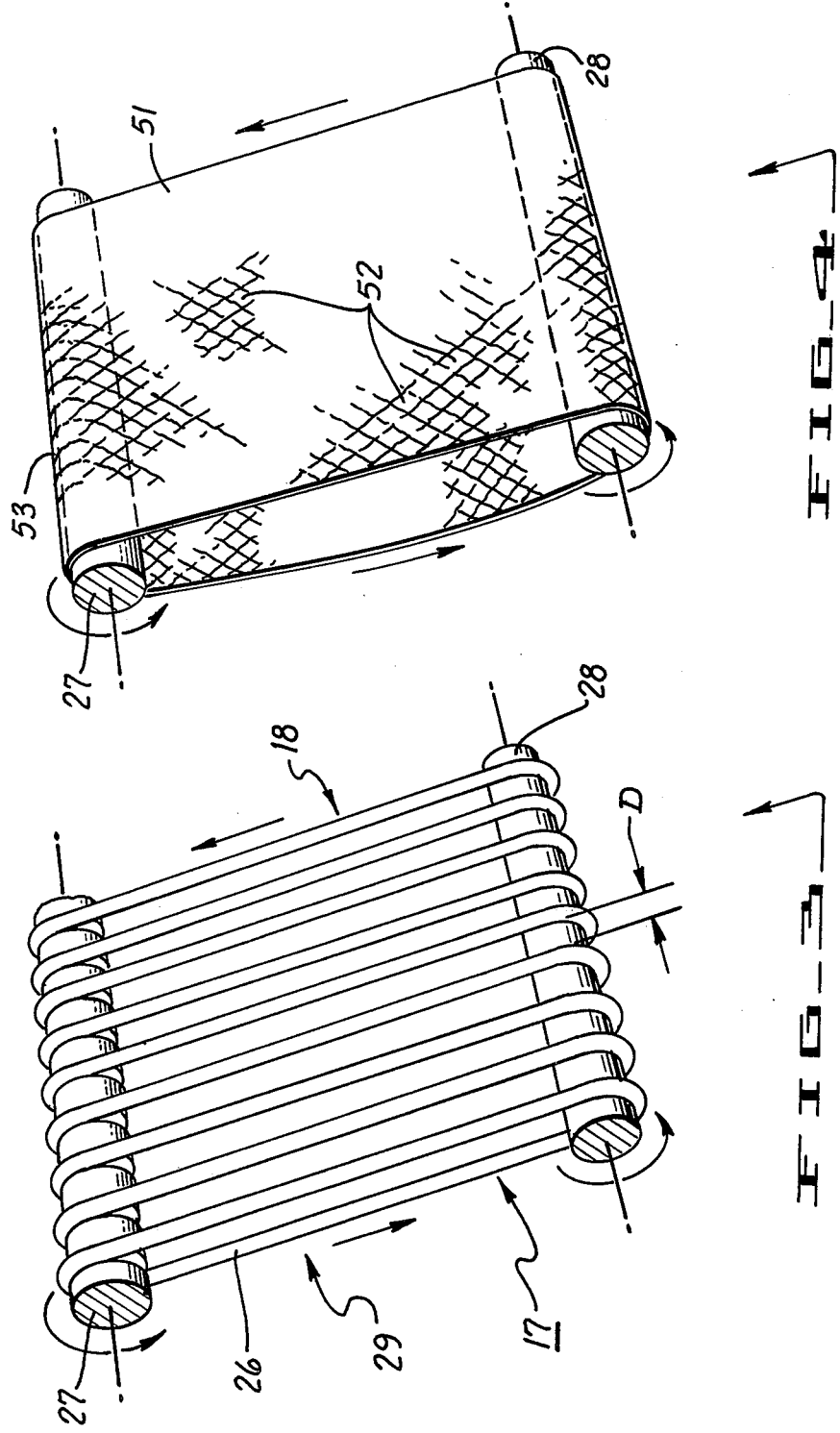

HARVEST SEPARATOR

FIELD OF THE INVENTION

The present invention relates to an apparatus for separating intermixed light and heavy materials and in particular an apparatus for harvesting and separating fruit, such as, nuts from accompanying leaves, other light particles of foreign matter and dirt carried in a common air stream.

DESCRIPTION OF THE PRIOR ART

A number of fruit harvesting implements have been developed for harvesting fruit which has fallen to the ground and is intermixed with leaves and other comparatively light particles of foreign matter. These devices employ various methods for elevating the fruit and nuts from the orchard floor, such as, by sweeping action, blowing action and vacuum or suction systems. After the mixture of heavy and light materials has been picked up from the orchard floor, they are then introduced to a separation zone whereby the fruit or nuts are deposited in one sector of the implement while the remaining debris is removed and ejected into the air or back onto the orchard floor.

An example of a nut harvestor employing vacuum action for the pick-up function is that shown in U.S. Pat. No. 3,568,422, issued to JOHN A. THIES, on Mar. 9, 1971. By virtue of a suction fan an air stream having entrained therein nuts, leaves and other debris is pulled into the main body of the device where curved fingers separate the nuts from the debris causing the nuts to fall downward and the debris to continue on in the air stream to an ejection port. A prior art device employing sweepers for the pickup function is shown in U.S. Pat. No. 3,872,657, issued to BARRY RAMACHER, et al, on Mar. 25, 1975. This device employs interdigitating brushes which toss the nuts and other debris from the ground into an air stream created by a suction fan. Instead of employing fingers for the separation function to cause the nuts to fall downwards, a vertically extended separator column is provided which inhibits the nuts from continuing to flow in the air stream but does not inhibit the lighter materials from flowing up and around the separator column and into an ejector port.

An implement utilizing a blower for performing the pick-up function is shown in U.S. Pat. No. 3,675,405, issued on July 11, 1972, to JOHN L. DENTON. This device employs a blower which impacts a stream of air onto the orchard floor picking up the nuts and other debris in the air stream which is then caused to pass up an inclined ramp. The ramp is comprised of metal rods oriented with their longitudinal axis in the direction of the air stream at space sufficiently far apart to allow the fruit being harvested to roll up the plane while the other entrained debris in the air stream passes through the openings between the rods. At the upper end of the ramp a recessed basket is provided to collect the nuts and a backstop is provided on the far side of the basket so as to catch any flying nuts and cause them to drop into the basket below. In this apparatus the separation function is accomplished primarily by a straining action as the nuts roll up a perforated incline plane while the debris passes through the perforations back to the orchard floor.

The above are simply exemplary of the prior art showing the various separation systems employed once fruit and unwanted entrained debris are being carried in an air stream. The separator function is primarily performed by a static device, such as, fingers, a separator column or a perforated ramp. However, in the present invention the structure performing the separation function has articulating parts which cooperate in a unique way with the air stream to produce a most effective separation of the fruit being harvested and unwanted entrained debris.

SUMMARY OF THE INVENTION

A preferred embodiment made in accordance with the principles of the present invention utilizes a separator structure having a surface which is impinged upon by the air stream containing the harvested fruit and other debris, which surface is driven by appropriate means to move in a direction opposite to the direction the fruits tend to fall by their own weight. This surface is provided with openings over a large area so that the air stream will tend to blow leaves and other debris onto the moving surface causing them to cling thereto until the moving surface reaches the uppermost portion at which point the clinging debris is ejected. The separated nut emerges from the lower regions of the separation zone into a collector. In commercial applications the collector zone may be provided with a conveyor system so as to continuously remove the harvested fruit to awaiting harvest receptacles, such as bins. The design of the separator structure of the present invention is such that it may be employed in a wide variety of harvesting implements of a wide variety of sizes, and will perform an extremely effective separating function between the fruit being harvested and extraneous debris gathered up from the harvest floor.

In order to more fully describe the various aspects of this invention, the following drawings and descriptions explain the various features and aspects thereof.

BRIEF DESCRIPTION OF THE DRAWINGS

FIG. 1 is a perspective view of a harvesting implement employing the separator structure of the present invention.

FIG. 2 is a front elevation view of the implement employing the present apparatus in cross-section through ramp and separator.

FIG. 3 is a perspective view of the separator element.

FIG. 4 is a perspective view of the separator element of an alternative design.

DETAILED DESCRIPTION

Referring by numerals to the accompanying drawings, which illustrate a preferred embodiment of the invention, in FIG. 1 a blower 11 creates an air stream 12 which impinges upon the ground 13 forcing nuts 14 and other debris 15, such as, leaves, twigs, dust and other matter found on the orchard floor up ramp 16 into the vicinity of the separator structure 17. As will be discussed in further detail below, the leaves and other debris tend to cling to the forward surface 18 of the separator structure and are carried to the top of said structure by virtue of the upwardly moving surface 18. The nuts having relatively high mass-to-area ratio will not cling to the surface 18 as will the other entrained materials, and, accordingly, will fall by their own weight into the collection zone 19. The aforementioned components of the harvesting apparatus can be carried on a mobile frame 20, which is steerable, and can contain the appropriate motors or engines for driving the blower and other components of the apparatus. Usually in a commercial device it is desirable to have a system for continuously removing the harvested fruit from the collection area 19, and, accordingly, a conveyor system 21 can be provided to carry the nuts into an appropriate harvesting receptacle, such as, a wooden bin (not shown). Although the mobile frame 20 will normally be sufficiently large to carry an operator, it is possible that in smaller units the operator will walk behind the unit to control its movement across the orchard floor. The path of the air stream and entrained materials is more clearly shown in FIG. 2 wherein the blower 11 causes air stream 12 to pick up the nuts and miscellaneous debris 15 from the orchard floor 13. The air stream and entrained materials will then pass over the leading edge 31 of ramp 16 and onto the main surface of the ramp 32. Although the surface of the ramp can be perforated so that stones and dirt particles can pass through, it is generally desirable that the main surface 32 be of solid construction so as to maximize the air flow up the ramp 16. Side shields 23 and 24 as shown in FIG. 1 are provided so as to direct the air stream and entrained materials into the separation and collection zones. Ramp surface 32 basically alters the vector of the air stream into a slightly upward direction causing a substantial portion of the entrained materials to impinge directly on front surface 18 of the separator element 17. As shown in FIG. 3, one preferred embodiment of the separator structure of the present invention employs a series of rubber belts 26 which have a cylindrical cross-section and pass around axles 27 and 28. The belts are separated by a distance D so as to create an elongated opening therebetween. One or both of the axles 27 and 28 can be provided with power means so as to cause them to rotate, thereby turning the belts 26. The rotation is such that the belts 26 move upward on side 18 and downward on side 29 of the separator structure 17. The value of the distance D is a function of the size of the fruit being harvested. For example, if the fruit is almonds, the value of D would be approximately one-half inch, depending upon the variety of almonds. However, in the case of walnuts, the value for D will be approximately three-quarters to one inch, again depending upon the type of walnut being harvested. In order to maintain a fairly constant distance D between the belts 26, it is necessary to provide grooves in at least one of the axles 27 and 28. For example, there is shown in FIG. 3 the upper axle 27 is provided with grooves which mate with the belts 26 keeping them in alignment during rotation. In the design shown in FIG. 3 the total area covered by belts 26 in the forward surface 18 is somewhat less than half, and, accordingly, the majority of the surface area 18 is the openings or spaces located between the belts 26. If no leaves or other debris are contained in the air stream, a substantial portion of the air stream would pass through in the openings between the belts with only the balance being deflected off of the front surface 18 of the separator so as to pass over the top thereof. However, when leaves and other debris are entrained, they tend to cover a portion of the front surface 18 and are held fast thereto primarily by virtue of the differential air pressure between the front side of the leaf and the back side of the leaf. In addition, the coefficient of friction between the rotating belts and the surface of the leaf, twig or other debris further add to the clinging tendency to cause the debris to be mobilized in an upward direction to the top 35 of the separator 17. In order to assure that the air stream flow moves in an aerodynamically efficient manner, it is frequently necessary to provide a deflector 36. This deflector also assures that the debris will not tend to fall back into the collection zone or interfere with the operator of the apparatus. Although the separator device 17 is shown in FIGS. 1 and 2 as being in a substantially vertical attitude, under certain circumstances it is desirable to move the collector away from the vertical position so as to accommodate any particular harvesting conditions that may be encountered, such as, fruit density, degree of dryness of the debris and other factors. In order to facilitate the adjustment of the separator 17 to an appropriate angle, it may be desirable to provide adjusting brackets for cooperation with upper portion 35 of the unit so that it may be tilted backward or forward at will. Likewise, the deflector plate 36 may be mounted on an adjustable framework so that it likewise can be adjusted to accommodate the particular harvesting conditions at the time of use. As shown in FIG. 1, there is a deflector plate 44 located in front of the separator element 17 in the lower portions thereof. Such a plate is useful under certain circumstances so as to cause the fruit, such as, nuts to impact the deflector 44 whereupon they drop into the collection zone without having to impact the front surface of the separator element 17. This saves wear on the belt structure and also minimizes the forcing of nuts through the openings between the belts so that they are caught between the front and the back surfaces of the belt system. In addition, the deflector 44 is useful to deflect debris that may be caught between the front and back sides of the belt away from the conveyor system. Usually any debris caught in area 45 will be ground up and self-cleansed by virtue of the rotation of axle 28. However, with certain crops or weather conditions it may be necessary to provide a small auxiliary blower to blow air across the upper surface of the lower axle 28 parallel to the axis thereto. Alternatively a small auxiliary conveyor belt could be placed in that area so as to move debris in a direction parallel to the axis of axle 28 and out of the area 45 to be dumped onto the ground at a point beyond the separator 17. The collector element 17 as depicted in FIG. 3 contains a gap D between the belt as explained above. Since various fruits will require different sized openings between the belts so as to avoid having the fruit pass between the openings, it is desirable to provide a technique for varying the distance D as desired. A number of approaches will occur to those skilled in the art, one being that several sets of separator element 17 may be provided with differing values for D, such as, approximately one-half inch when harvesting almonds, approximately three-quarters of an inch when harvesting walnuts, etc. Another approach would be to fabricate axles 27 and 28 in segments, with one segment for each belt, so that shims could be placed therebetween to vary the distance D as desired.

An alternative design for providing a surface moving in a direction opposite to the direction in which the fruit is falling, is shown in FIG. 4. Here a meshed fabric is provided in a sheet form which travels around the axles 27 and 28. This meshed fabric may be of either metallic or non-metallic composition and is designed to have openings 52 therein such as to allow relatively free passage of air, but to inhibit the passage of the fruit being harvested. Again, a substantial portion of the air stream will tend to pass through the mesh where no leaves or other debris are present, thereby creating effective aerodynamic circumstances so that when leaves are present they are caused to be held tightly to the surface of the meshed fabric 51. Once the leaves and other debris pass over the top, the air pressure differential disappears and the air sweeping across the top of the leaves and other debris tends to lift them off the surface and eject them out into the air where they drift to the orchard floor below. Other suitable designs for the movable surface necessary for carrying out the principles of the present invention will suggest themselves to those skilled in the art. For example, one may use a flat sheet of material, such as, rubber, with perforations or holes placed therein so as to produce the desired aerodynamic effects.

Referring again to FIG. 2, the blower 11 produces an air stream 12 which impacts against the orchard floor 13 and the fallen fruit and debris lying thereon. The air stream then picks up this material and transports it across the leading edge 31 which is in close proximity of the ground, up the incline plane of ramp 16. Due to the more dense nature of most fruits, some will, upon reaching the trailing edge 39, immediately drop into the collection zone 19. Some of the fruit, for example, almonds, will continue to be carried by the air stream upwardly for a predetermined distance, however, the gravitational effects will overcome the momentum of the almond causing it to likewise drop into the collection zone 19. Other almonds will impinge on the surface 18 of the separator element 17 and, due to aerodynamic forces and momentum, will cling thereto for a predetermined distance until such upward moving forces are overcome by gravitation and the almonds fall into the collection zone 19. The debris 15, however, which is picked up in air stream 12, has a comparatively low mass-to-surface area ratio and, accordingly, tends to be carried in the air stream past the trailing edge 39. Some of the debris, which is smaller than the openings in the surface of the collector 17, will pass through the separator and settle to the valley floor. However, other debris, such as, leaves and twigs of greater dimension, will tend to cling to the forward surface 18 of the separator and will be held thereto while the surface moves upwardly until passing over the top of axle 27. At this point the forces acting upon the leaves, twigs or other debris, will tend to lift them off the surface of the separator causing them to be expelled into the ambient air and will eventually settle back to the orchard floor. A good deal of the debris will simply be carried in the air stream which passes in front of but without contacting the separator 17 and will be deflected by the plate or deflector 36 so as to be ejected into the ambient air.

Although the separator element 17, as described hereinabove, has been shown for use in connection with a pick-up system employing a blower, it is possible to use the device in connection with other pick-up systems. For example, it could be used in a suction system, such as that shown in U.S. Pat. No. 3,872,657, referred to hereinabove, by being placed in the general zone occupied by separator column 58, as shown in FIG. 2 of the aforesaid patent. The basic function effected by the separator of the present invention is to create aerodynamic conditions and motion conducive to moving entrained debris in a direction opposite to which the harvesting fruit is being propelled into the collection zone.

From the foregoing description, it will be readily seen that there has been produced such a separator structure as substantially fulfills the objects of the invention, as set forth herein.

While the specification sets forth in detail the present and preferred construction of the apparatus, in actual practice deviations from such detail may be resorted to without departing from the spirit of the invention, as defined in the appended claims.

I claim:

1. A mobile apparatus for harvesting nuts and the like together with various harvest debris which particles have been placed in elongated windrows on the orchard floor, comprising:
   a. a mobile frame which is movable over the orchard floor along a path substantially parallel to said windrows;
   b. means for blowing an airstream of air generally parallel to said orchard floor and substantially transverse to said windrow whereby said particles are entrained in said airstream;
   c. a ramp inclined upwardly along a longitudinal axis having a leading edge at substantially the level of the orchard floor and a trailing edge elevated above the orchard floor, said ramp being positioned with its longitudinal axis in said airstream and said particles entrained therein and with the trailing edge being downstream of the leading edge, whereby said airstream and said particles entrained therein are deflected upwardly at a first predetermined angle causing a verticle vector being imposed in the line of travel of said particles thereby causing gravity to decelerate high mass-to-area particles at a faster rate than lower mass-to-area particles;
   d. conveying means having an upstream side and a downstream side with respect to said airstream, such conveying means located with the upstream side adjacent to and lower than said trailing edge of the ramp whereby a portion of the high mass-to-area particles, the nuts and the like, descend over the edge of said trailing edge of said ramp and onto said conveying means due to deceleration by gravity and the balance of said particles remain entrained in said airstream; and
   e. an upwardly movable surface,
      (1) having an upper portion and a lower portion and positioned with its lower portion substantially adjacent to said downstream side of said conveying means,
      (2) inclined upwards along a longitudinal axis in substantial alignment with the longitudinal axis of said ramp, said inclination being such as to further deflect the particles therein by a second predetermined angle causing an increased vertical vector to be imposed in the line of travel of said particles thereby causing gravity to decelerate high mass-to-area particles at a faster rate than the low mass-to-area particles whereby a portion of said debris is carried in said stream to the upper portion of the movable surface without contacting the movable surface,
      (3) the upwardly movable surface having openings over a predetermined area thereof, said openings being smaller than the size of the nuts and the like whereby the force by which the airstream forces the nuts and the like against the movable surface is less than the pull of gravity thereon causing the nuts and the like to descend onto the conveying means below and whereby the debris is held by the airstream against said movable surface with sufficient force to cause the movable surface to move said debris to the upper portion of said movable surface where it is ejected into the airstream and carried away from the apparatus.

2. A mobile apparatus as in claim 1 wherein the movable surface is a series of parallel belts rotating about upper and lower horizontal shafts, said belts being spaced apart so as to create said openings.

3. A mobile apparatus as in claim 1 wherein the movable surface is a flexible mesh containing said openings rotating about upper and lower horizontal shafts.

4. A mobile apparatus as in claim 1 wherein means are provided for deflecting the air stream around the upper portion of said movable surface.

* * * * *